United States Patent [19]

Horner

[11] Patent Number: 4,826,285

[45] Date of Patent: May 2, 1989

[54] METHOD OF ENHANCING THE SIGNAL TO NOISE RATIO OF AN IMAGE RECOGNITION CORRELATOR

[76] Inventor: Joseph L. Horner, 76 Brattle St., Cambridge, Mass. 02138

[21] Appl. No.: 101,058

[22] Filed: Sep. 24, 1987

[51] Int. Cl.⁴ ............... G02B 27/46; G06F 15/336; G06G 9/00; G06K 9/62
[52] U.S. Cl. ........................ 350/162.13; 364/822; 382/42
[58] Field of Search .............. 350/162.12, 162.13, 350/162.14, 162.15; 364/819, 822, 827; 382/31, 42

[56] References Cited

U.S. PATENT DOCUMENTS 4,275,454 6/1981 Klooster, Jr. ............ 350/162.12 X
4,588,260 5/1986 Horner ....................... 350/162.13

OTHER PUBLICATIONS

Horner, J., et al., "Signal-Dependent Phase Distortion in Optical Correlators," *Applied Optics*, vol. 26, No. 12, 15 Jun. 1987, pp. 2484–2490.

Primary Examiner—John K. Corbin
Assistant Examiner—David J. Edmondson
Attorney, Agent, or Firm—Robert L. Nathans; Donald J. Singer

[57] ABSTRACT

Method of producing an enhanced output correlation signal from an image matching correlator includes the steps of further transforming data representing an input image to produce a transformed image, multiplying the transformed image by at least one reference filter function representing a reference image to be compared with the input image to produce a product signal, inverse fourier transforming the product signal to product the output correlation signal, and introducing phase distortions within the reference filter function, sufficient to greatly enhance peak values and narrow the area of the correlation peak of the output correlation signal. The method may utilize optical or digital electronic correlation and transformation.

18 Claims, 4 Drawing Sheets

METHOD OF ENHANCING THE SIGNAL TO NOISE RATIO OF AN IMAGE RECOGNITION CORRELATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to image recognition correlators in general, including those using spatial light modulators having phase distortions therein.

Spatial light modulators (SLMs) provide a very attractive way of transforming the traditional two-lens Fourier transform optical processor into a practical real-time system. Several researchers have reported on such systems for pattern recognition by using the systems to compute in analog fashion a correlation integral. See for example the following papers: D. Psaltis, E. Paek, and S. Venkatesh, "Optical Correlation with a Binary Spatial Light Modulator," Opt, Eng. 23, 698 (1984). D. Flannery, A. Biernacki, J. Loomis, and S. Cartwright, "Real-Time Coherent Correlator Using Binary Magnetooptic Spatial Light Modulators at Input and Fourier Planes," Appl. Opt. 25, 466 (1986). See also my U.S. Pat. No. 4,588,260.

It is usually assumed when such an SLM is used as the input means of a coherent optical processor, that the SLM effectively modulates the amplitude a(x,y) of the light exiting the device:

$$a(x,y) = A_o s(x,y), \quad (1)$$

where $A_o$ is an arbitrary constant and $s(x,y)$ is the signal input to the first input SLM. It is known that there is an attendant phase shift introduced at each pixel by the SLM-a signal-dependent phase distortion. The liquid crystal light valve shows a linear effect with a slight admixture of quadratic component. However, the exact nature of the phase distortion is unimportant as long as its effect is dealt with in accordance with the present invention.

Initially, it seemed reasonable to others to try and keep this effect small, since one feels instinctively that it could only degrade the correlation process. In accordance with my invention however, this effect is utilized to enhance greatly the correlation response in terms of signal to noise ratio (SNR) and the narrowness of the correlation response, both highly desirable in a practical optical or electronic signal processor.

SUMMARY OF THE INVENTION

A preferred method of producing an enhanced output correlation signal from an image matching correlator includes the steps of fourier transforming data representing an input image to produce a transformed image, multiplying the transformed image by at least one reference filter function representing a reference image to be compared with the input image to produce a product signal, inverse fourier transforming the product signal to product the output correlation signal, and introducing phase distortions within the reference filter function, sufficient to greatly enhance peak values and narrow the area of the correlation peak of the output correlation signal. The method may utilize optical or digital electronic correlation and transformation.

BRIEF DESCRIPTIONS OF THE DRAWINGS

Other objects, features and advantages of the invention will become apparent upon study of the following description, taken in conjunction with the drawings in which:

FIG. 1 discloses an optical correlator in accordance with the present invention.

FIGS. 2, 3, 5, 6, 8 and 9 disclose plots of the SNR v. phase distortion for the uncompensated and compensated conditions.

FIG. 4 discloses plots of relative area of correlation peak v. phase distortion.

FIGS. 7(a)-7(d) illustrate correlation output signal response for increasing phase distortion.

FIG. 10 discloses a flow chart for the non-optical embodiment of the invention.

DETAILED DESCRIPTION OF PREFERRED EMBODIMENTS

Figure 1:
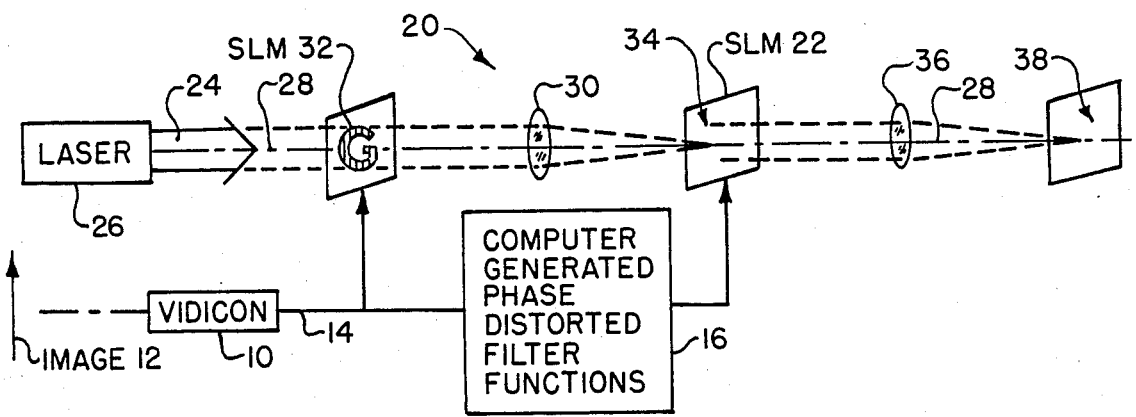

FIG. 1 schematically illustrates an optical processor mentioned above. A Fourier Transform lens 30 is placed in optical alignment with beam 24 produced by laser 26, along optical axis 28, one focal length f after an input signal 32 formed within a first spatial light modulator 32'. Lens 30 forms the Fourier Transform of signal 32 (having both amplitude and phase information) at a preselected location 34, i.e. a focal length f beyond lens 30. It should be noted that all focal lengths in correlator 20 may be, but need not be, equal in length. The reference filter 22 comprising a second SLM, is placed at location 34 and provides information of another signal which is representative of the object to be compared with or correlated with signal 32. Situated one focal length f, from location 34, is an inverse Fourier Transform lens 36 (i.e. a Fourier Transform lens which is identical to lens 30 except that in operation, the coordinates are inverted). Lens 36 takes the inverse Fourier Transform of the product of signal 32 and the reference filter information signal. This inverse Fourier Transform is formed at location 38, one focal length f from lens 36, and still coincidental with optical axis 28. The inverse Fourier Transform formed at 38 is equivalent to the mathematical correlation function between signals.

In a real time correlation system, vidicon 10 could initially view a series of reference input images (e.g. characters, tanks or other objects to be recognized) 12 and the vidicon output pulse train at 14, could be inputted into a small digital computer 16, to create a library of stored reference filter functions, one filter function for each reference object to later be correlated with the input image at 12 being viewed for recognition purposes. The Fourier sequentially produced and stored within computer 16 by deriving the arc TAN of the Fourier Transform (Eq. 9 and 10 infra) of the signal representing image 12, as phase distorted by input SLM 32', for each pixel point in the image. In order to produce a correlation filter function, calculations are performed in a conventional manner by computer such as the VAX computer manufactured by Digital Equipment Corporation, to produce the desired phase information. These calculations, more commonly referred to as the Fast Fourier Transform (FFT), are set forth by Cooley and Turkey in an article entitled "An Algorithum for the Machine Calculation of Complex Fourier Series." Mathematics of Computation, Volume 19, No.

90, April 1965, pp 297–301, and incorporated herein by reference. These procedures are known to workers in the art and thus will not be described in futher detail.

We begin by augmenting Eq. (1) with a phase term representing the signal-dependent phase noise, $$a(x,y) = A_0 s(x,y) \exp\{i\phi[s(x,y)]\}, \quad (2)$$

where $\phi$ is the signal-dependent phase function. We will assume that $s(x,y)$ is normalized to unity. To be perfectly general, we will expand $\phi$ in the Taylor series $$\phi = K_1 \pi s + K_2 \pi s^2 + K_3 \pi s^3 + \ldots \quad (3)$$

We are first going to computer simulate the results of autocorrelating the signal with a matched filter defined as $$H = FT^*[s(x,y)] \quad (4)$$

and the phase-only filter (POF), defined as $$H_\phi = POF\{FT^*[s(x,y)]\}, \quad (5)$$

where FT is the Fourier transform operator, * is the complex conjugation, and POF is a nonlinear phase-only filter operator which extracts the phase of a function by setting the amplitude equal to one at each point. For reasons to be explained, we refer to filters made according to Eqs. (4) and (5) as uncompensated filters. The input signal for these simulations was a 64×64 gray scale picture of a girl's face embedded in a 128×128 array of zeros. Calculation was carried out using a VAX/780 computer with the FFT algorithm and autocorrelation theorem to produce the correlation signal of any function f:

$$C(x,y) = FT^{-1}\{FT\{f\} \cdot FT^*\{f\}\}, \quad (6)$$

where C is the correlation function.

Figure 2:
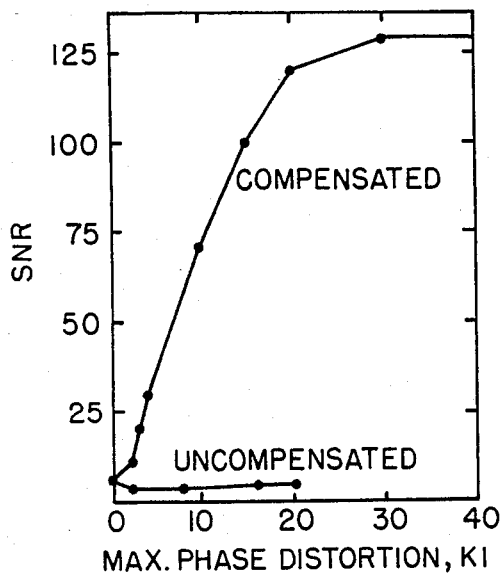
Figure 3:
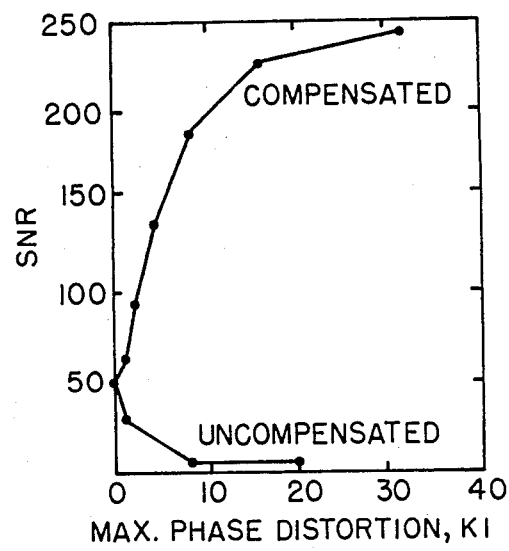

The first case treated was that in which $a(x,y)$, the distorted version of the signal produced by the first SLM 32 [Eq.(2)], was correlated with an uncompensated filter [Eq. (4) or (5)]. The SNR using only the linear term (involving $K_1$) in Eq. (3) is depicted for the matched filter by the lower curve in FIG. 2 and for the POF by the lower curve in FIG. 3. The Y axis is the SNR, defined as $$SNR = C_{max} \left| \left( \sum_{i=1}^{N} C_{i<50\%}^2 \Big| \sum_{i=1}^{N} N_i \right) \right|^{\frac{1}{2}} \quad (7)$$

Figure 4:
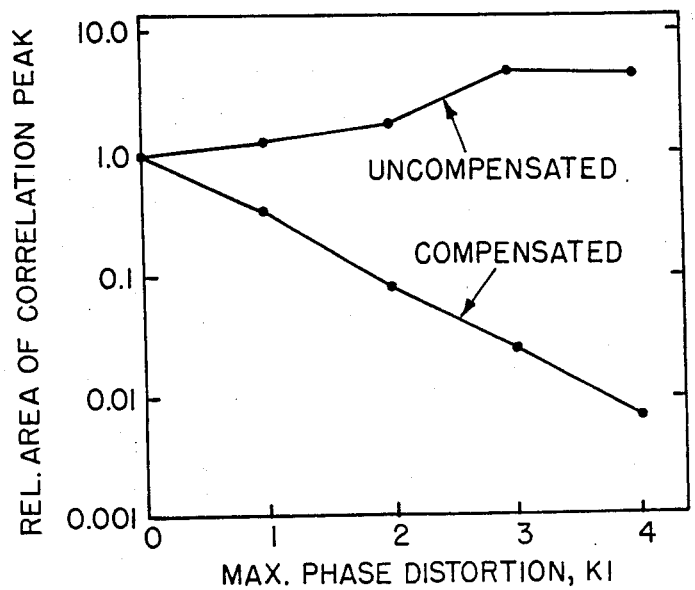

This is a slightly different definition from the usual one, (peak signal over RMS noise) in that the denominator includes points in the correlation signal itself if they are within 50 percent of the peak $C_{max}$. This is a practical definition intended to penalize correlators or filters that produce broad sidelobes which could obscure weak targets or be taken for false targets in the field of view. As can be seen, in both the lower curves of FIGS. 2 and 3, there is a degradation in performance as phase distortion parameter $K_1$ increases. Also, the correlation signal for both filters gets broader. The area at half-maximum for the correlation signal is shown in FIG. 4 for the matched filter as a function of maximum linear phase distortion, normalized to the value at $K_1 = 0$.

Figure 5:
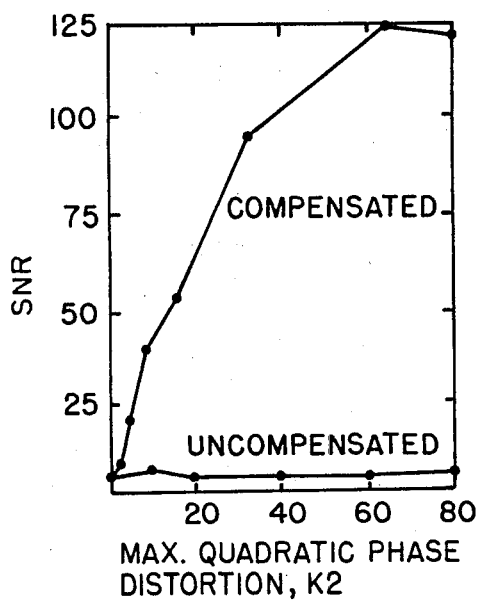
Figure 6:
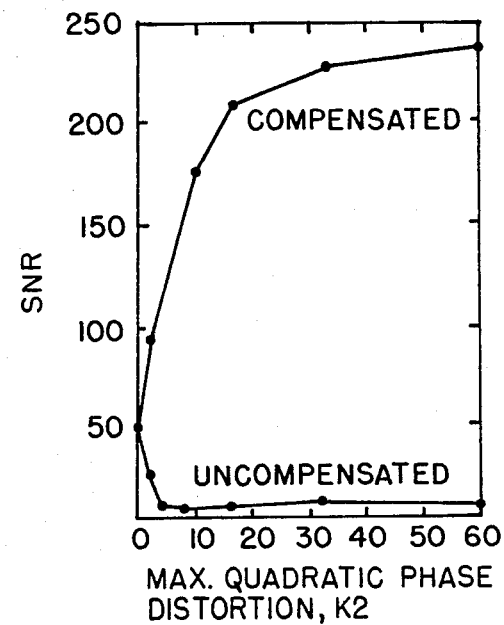

The lower curves of FIGS. 5 and 6 show the results for the quadratic phase term only: $K_1 = 0, K_2 \neq 0$, for the matched filter and POF, respectively. A simiilar behavior results, namely, a degradation in SNR performance.

We then examined what happens if we kept the distorted signal produced by the first SLM 32' but made the filter using the distorted version of the input signal for the matched filter, $$H = FT^*(s(x,y) \exp\{i\phi[s(x,y)]\}) \doteq S \exp(-i\psi) \quad (8)$$

$$H = FT^*(s(x,y) \exp(i(K_1 \pi S + K_2 \pi S^2 + \ldots)) \quad (8A)$$

and similarly for the POF. We refer to filters made according to Eq. (8) and equivalent equation (8A) as compensated filters. The results are shown by the upper curves of FIGS. 2, 3, 5 and 6. Note that there is a dramatic improvement in SNR, especially as the distortion constant K increases. In the case of the matched filter the SNR improves by a factor of 23.7 and the POF by 5.2. There is also a dramatic and desirable narrowing of the area of the correlation peak for the matched filter. This is plotted in the lower graph of FIG. 4 as a function of $K_1$. Three-dimensional plots of this effect are shown in FIG. 7 for the matched filter where the linear phase distortion $K_1$ is gradually increased. We also investigated mixtures of linear and quadratic phase distortion and observed the same general results: a significant improvement in SNR for the compensated filter as the maximum distortion increases.

Figure 8:
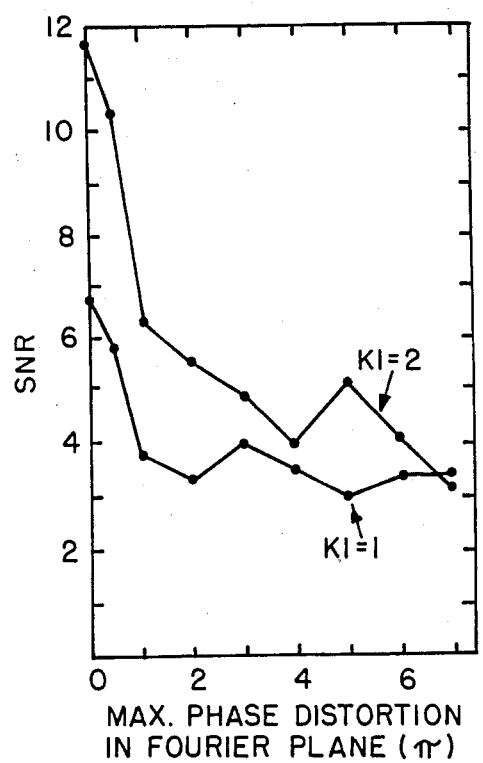
Figure 9:
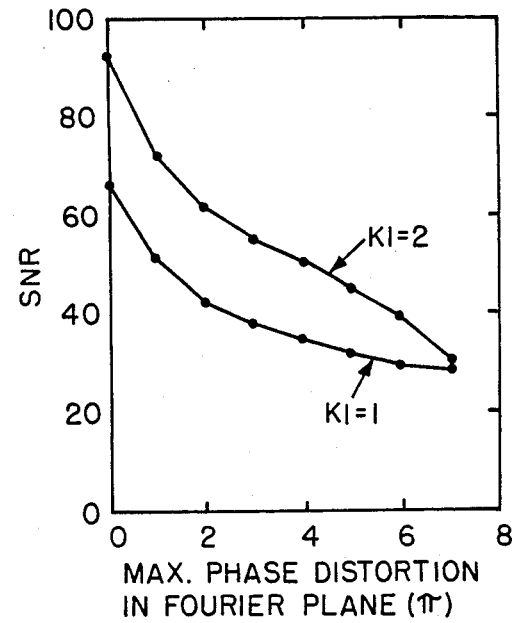
Figure 7A:
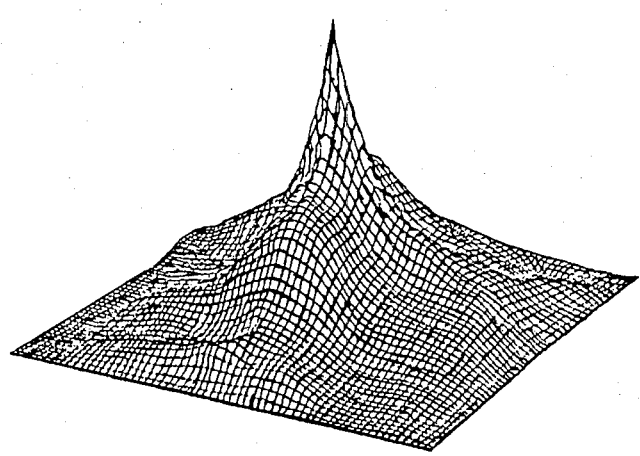
Figure 7B:
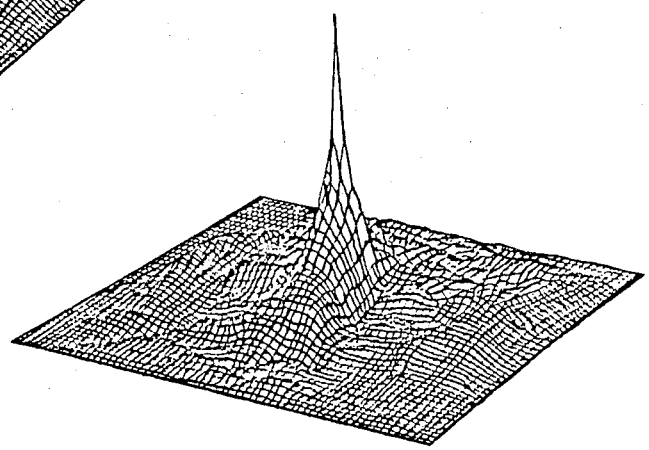
Figure 7C:
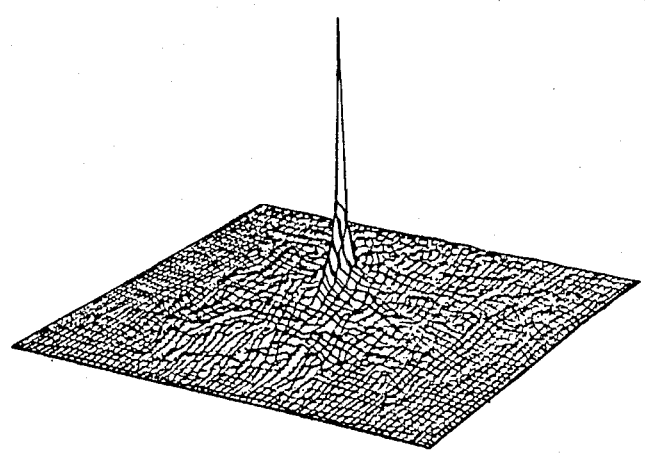
Figure 7D:
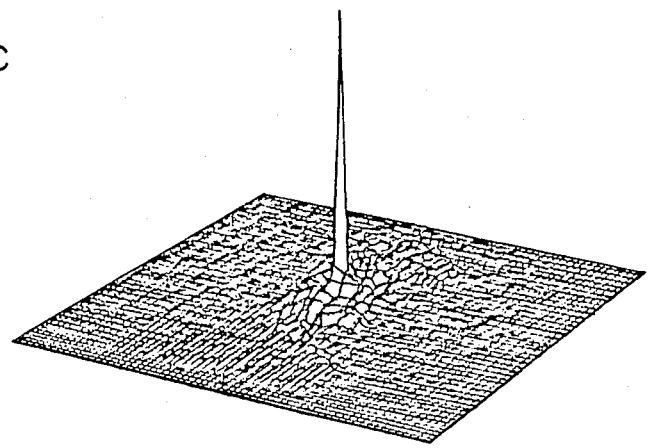

Thus, in accordance with an important aspect of the present invention, the distortion values for the first input SLM 32' are made as large as possible, in contrast with prior attempts to minimize the K values in the manufacture of SLM'S to be used in the input image plane at 32. As is well known by workers in the art, increasing the distortion parameter K is controllable by the SLM design engineer by varying the bias potential, and/or the orientation of the SLM crystal before it is cut, and/or the type of crystal selected. Although we have seen a great improvement in performance when the SLM has a large amount of signal-dependent phase distortion which is compensated in the reference filter functions, the question naturally arises: What happens if a distorting SLM is also used in the Fourier plane to write the reference filter functions, as given by Eq. (8)μ That is, we let the filter be $$H = [S \exp(iK_1 \pi s)] \cdot \exp(-i\psi), \quad (9)$$

where the first factor is the amplitude of the compensated filter with a linear signal dependent phase distortion included [see Eq. (2)], and the second factor is the prescribed phase [Eq (8)]. This situation occurs if a phase distorting amplitude SLM were used to write the first factor of Eq. (10), a phase modulating SLM wrote the second factor, and the two SLMs were sandwiched together. This is one way to realize a real-time nonholographic matched filter correlator. FIG. 8 shows the result for the compensated matched filter where both input filter plane SLMs contain linear distortion. The lower curve is for the case when the maximum linear distortion of the input SLM is $\pi$ ($K_1 = 1.0$), and the maximum value of linear distortion in the Fourier plane SLM is allowed to take on a range of values from 0 to 7 ($\pi$). The upper curve shows the results when $K_1 = 2.0$; FIG. 9 shows the same type of experiment for the compensated POF. Taken together, we can easily see that instead of helping the system performance, signal-dependent distortion in the Fourier plane severely degrades it. The conclusion is clear: either use an SLM without any signal-dependent phase distortion in the Fourier plane or precompensate for it in the signal fed to the Fourier plane SLM. This involves no more than a simple subroutine in the microprocessor program driving this SLM.

Thus in contrast with the first input image SLM 32', the second SLM 22 at the Fourier plane should have no phase distortions unless precompensation is employed. However, the reference filter-functions produced by computer 16 as discussed above, will incorporate phase distortions which are substantially equal in degree to the signal dependent phase distortions (preferably maximized) of the first input image SLM. The values of phase distortions of the first input SLM 32' are measured by conventional interferometric techniques. For example, use of the well known MACH-ZEHNDER interferometer can be used to determine the values of $K_1$ and $K_2$ of equations (3) and (9).

NON-OPTICAL IMAGE CORRELATION

Figure 10:
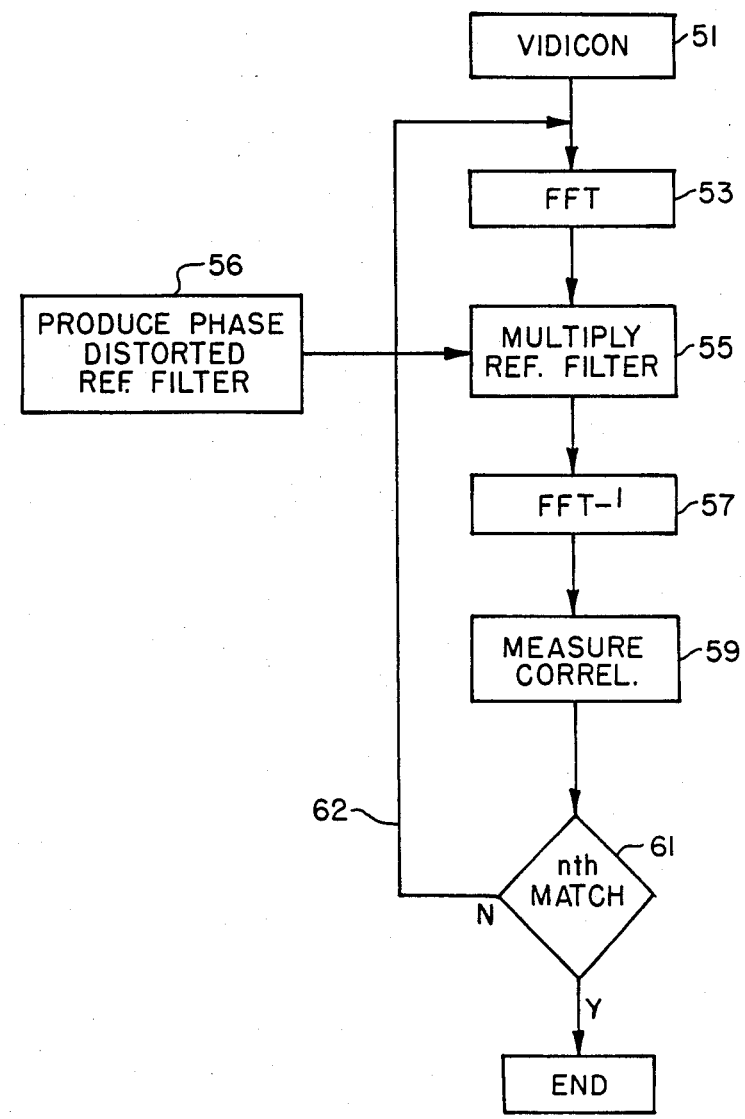

The aforesaid steps performed by SLM 32', SLM 22, and transform lenses 30 and 36 may be performed by a digital computer, in light of the teachings set forth above, including the article by Cooley and Turkey. As indicated by blocks 51 and 53 of FIG. 10, the digitized input image is fast fourier transformed at 53, and sequentially multiplied by a sequence of n reference filter functions at 55, the product of each filter function and the transform of the digitized input image being inverse fourier transformed at 57. Block 56 indicates that the reference filter functions are phase distorted as previously described in connection with computer 16. The degree of correlation is measured by a computer routine at 59, and the process is repeated via decision diamond 61 and loop 62, until the nth filter function is compared with the tranformed input image signal. The computer routine will measure numerical data, rather than light intensity, to determine if a given threshold is exceeded, for each match at 59, indicative of recognition of the input image or images. The programming of such a computer routine is well within the skill of the ordinary worker in the art, as is the key step of deliberately introducing substantial phase distortions within the fast fourier transforms of the reference filter functions (as previously explained), before they are sequentially matched at 59 with the transformed input image. For a general description of a digital computer image matching system, see "Laser Focus" magazine, August 1987, Pages 109–110.

Having described specific preferred embodiments of the invention with reference to the accompanying drawings, it is to be understood that the invention is not limited to those precise embodiments, and that various modifications may be effected by one skilled in the art without departing from the scope or spirit of the invention as defined in the appended claims. The presently preferred best mode of practising the invention is the optical embodiment.

What is claimed is:

1. A method of producing an enhanced output correlation signal from an image matching correlator comprising the steps of:
    (a) fourier transforming data representing an input image to produce data representing a transformed image;
    (b) multiplying said data representing a transformed image by a reference filter function representing a reference image to be compared with said input image, to produce a product signal;
    (c) inverse fourier transforming said product signal to produce said output correlation signal; and
    (d) introducing phase distortions within said reference filter function, before the performance of step (b), sufficient to substantially enhance peak values of said output correlation signal.

2. The method of claim 1 wherein step (d) is performed by utilizing phase distortion constant $K_1$ in the following equations:

$$a(x,y) = A_0 s(x,y)\{\exp i\,[s(x,y)]\}, \qquad (2)$$

$$\phi = K_1 \pi s + K_2 \pi s^2 + K_3 \pi s^3 + \qquad (3)$$

having a value of between one and sixty.

3. The method of claim 1 wherein steps (a), (b), and (c) are performed optically.

4. The method of claim 2 wherein steps (a), (b), and (c) are performed optically.

5. The method of claim 1 wherein steps (a), (b), and (c) are performed by a digital computer.

6. The method of claim 2 wherein steps (a), (b), and (c) are performed by a digital computer.

7. The method of claim 1 wherein said reference filter function comprises a fast fourier transform of a reference image signal.

8. The method of claim 2 wherein said reference filter function comprises a fast fourier transform of a reference image signal.

9. The method of claim 5 wherein said reference filter function comprises a fast fourier transform of a reference image signal.

10. The method of claim 6 wherein said reference filter function comprises a fast fourier transform of a reference image signal.

11. A method of improving the signal to noise ratio of an output correlation signal from an optical correlator employing a first spatial light modulator, having signal dependent phase distortions, for producing an input image, a second spatial light modulator, means for producing the fourier transform of said input image, as phase distorted by the first spatial light modulator, in the plane of said second spatial light modulator, reference filter function generating means for also applying a reference filter function to said second spatial light modulator to produce the product of the fourier transform of said input image as distorted by said first spatial light modulator, and said reference filter function, and means for generating the inverse fourier transform of said product, thus producing said output correlation signal, indicative of the degree of similarity between said input image and said filter reference function, said method comprising the step of:
    deliberately producing phase distortions within said reference filter function substantially equal to the phase distortions of said first spatial light modulator, to enhance the signal to noise ratio of the output correlation signal of said optical correlator.

12. The method of claim 11 including the step of utilizing a first spatial light modulator having a maximum degree of phase distortions associated therewith.

13. The method of claim 11 including utilizing a second spatial light modulator having substantially no phase distortion.

14. The method of claim 12 including utilizing a second spatial light modulator having substantially no phase distortion.

15. A method of improving the signal to noise ratio of an output correlation signal from an optical correlator employing a first spatial light modulator, having signal dependent phase distortions, for producing an input image, a second spatial light modulator, means for producing the fourier transform of said input image, as phase distorted by the first spatial light modulator, in the plane of said second spatial light modulator, reference filter function generating means for also applying a reference filter function to said second spatial light modulator to produce the product of the fourier transform of said input image as distorted by said first spatial light modulator, and said reference filter function, and means for generating the inverse fourier transform of said product, thus producing said output correlation signal, indicative of the degree of similarity between said input image and said filter reference function, said method comprising the steps of:
 (a) determining the degree of the signal dependent phase distortions of said first spatial light modulator; and
 (b) deliberately producing phase distortions within said reference filter function substantially equal to the phase distortions of said first spatial light modulator, to enhance the signal to noise ratio of the output correlation signal of said optical correlator.

16. The method of claim 15 including the step of utilizing a first spatial light modulator having a maximum degree of phase distortions associated therewith.

17. The method of claim 15 including utilizing a second spatial light modulator having substantially no phase distortion.

18. The method of claim 16 including utilizing a second spatial light modulator having substantially no phase distortion.

* * * * *